April 28, 1970 G. LEDERLIN 3,508,840
METHOD OF AND MACHINE FOR TRANSFORMING ENERGY IN FLUID MEDIA
Filed April 9, 1968 5 Sheets-Sheet 1

Inventor:
Guy Lederlin
By Michael S. Striker
Attorney

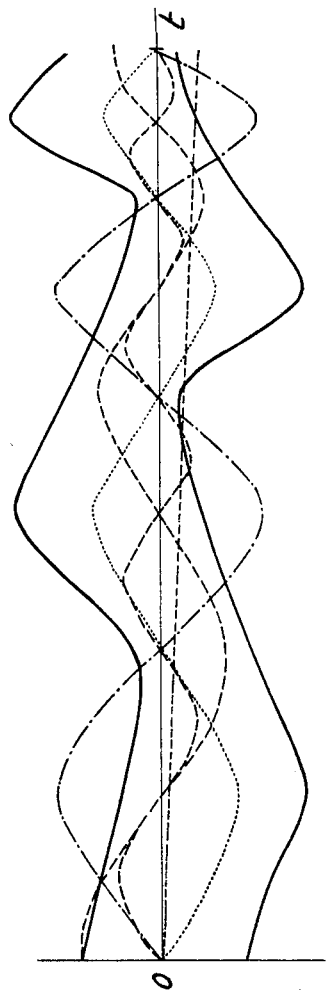
Fig.4a
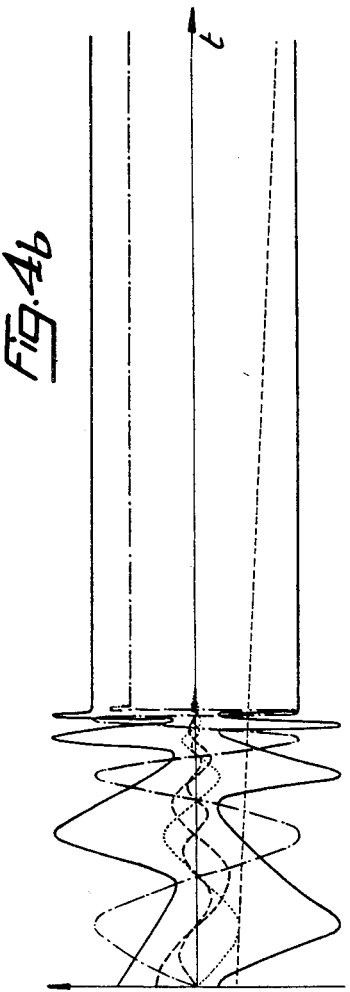
Fig.4b
Fig.3b
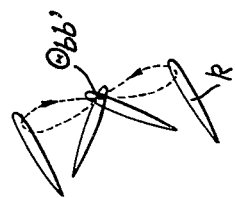
Fig.3a
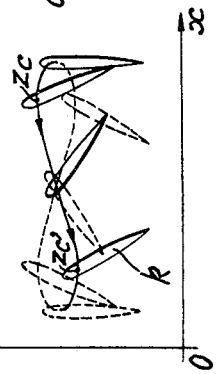
Inventor,
Guy Lederlin
By Michael S. Striker,
Attorney April 28, 1970 G. LEDERLIN 3,508,840
METHOD OF AND MACHINE FOR TRANSFORMING ENERGY IN FLUID MEDIA
Filed April 9, 1968 5 Sheets-Sheet 3
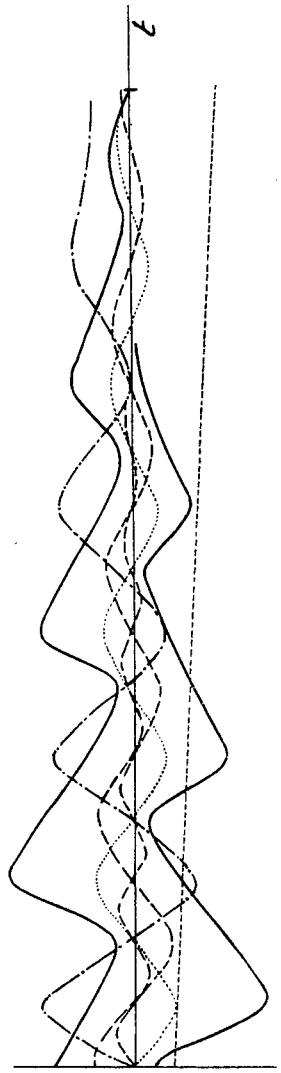
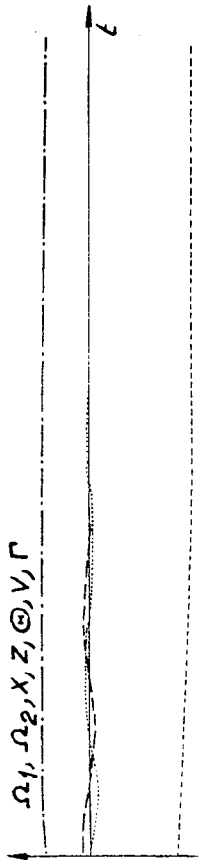
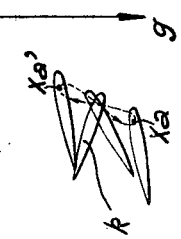
Inventor:
Guy Lederlin
By Michael S. Striker
Attorney

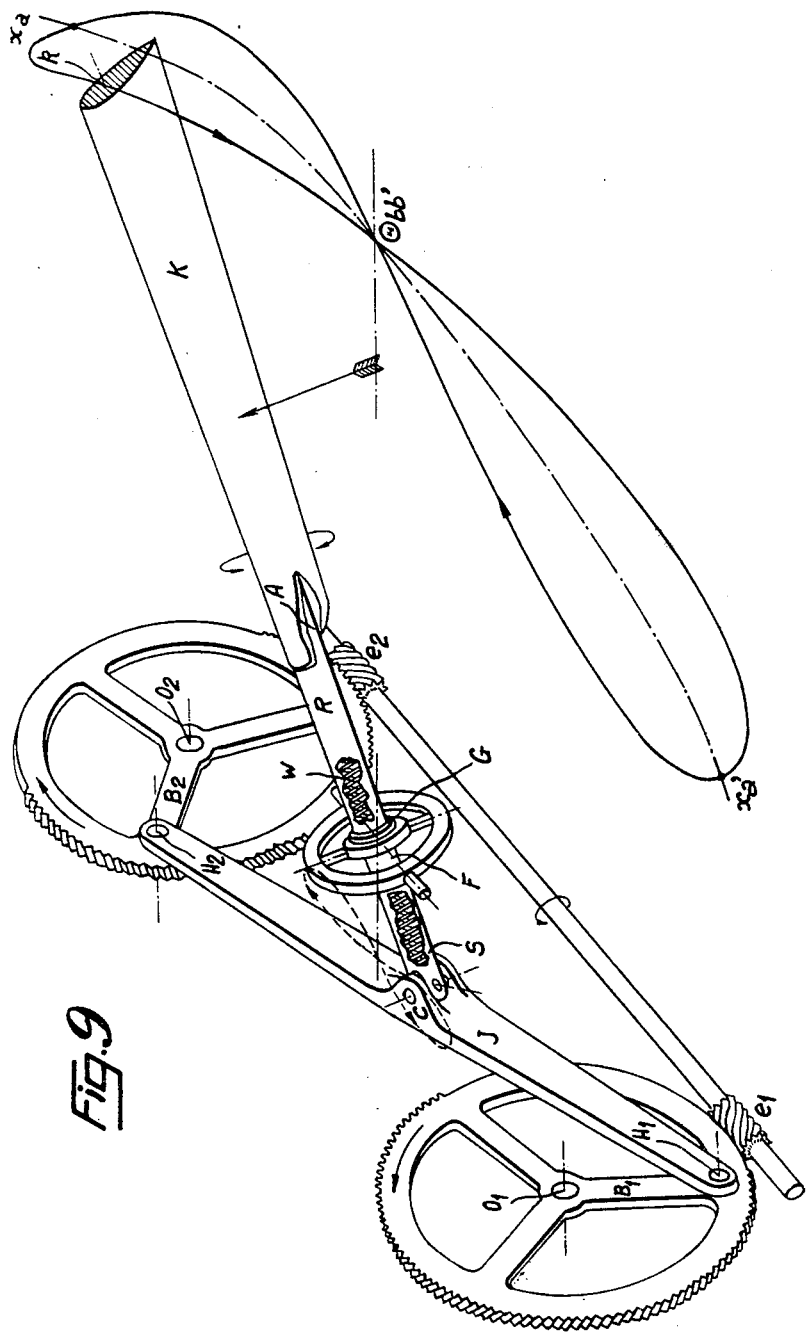

United States Patent Office 3,508,840
Patented Apr. 28, 1970

3,508,840
METHOD OF AND MACHINE FOR TRANSFORMING ENERGY IN FLUID MEDIA
Guy Lederlin, 6 Rue d'Auteuil, Paris, France
Filed Apr. 9, 1968, Ser. No. 721,129
Claims priority, application France, July 17, 1967, 114,422
Int. Cl. B64c 33/02
U.S. Cl. 416—1
16 Claims

ABSTRACT OF THE DISCLOSURE

A machine for transforming fluid energy has a wing system with at least one airfoil which, while transforming energy, creates and maintains a vortex doublet by which stored energy is returned by blowing at the surface of the airfoil so that separation of fluid from the surface is inhibited. A mechanism imparts to the airfoil a composite motion comprising the flapping movements, one transversely to the airfoil span, and the other being a rotary movement.

The present invention is concerned with the transformation of energy in fluid media.

It is known that in this field various types of stationary or movable power units and generators have already been proposed. However, this invention relates more particularly to the transformation of energy in fluid media by means of autonomous machines comprising movable wing-system operating by variation in the velocity imparted to the fluid medium.

In conventional machines of this type the downstream flow has a rectilinear tendency and the variation in the velocity imparted to the medium continues during a certain time after the passage of the plane of action of the wing-system.

Now as the desired variation is proportional to the output and to the velocity variation induced thereby, and as the resultant power is inversely proportional to the variation time, it has been endeavored to avoid this inconvenience by producing a divergence in the downstream flow with the assistance of contrivances independent of the flow characteristics inherent to the wing system.

In contrast thereto, it is the object of the present invention to produce this divergence in the downstream flow by utilizing the inherent flow of a movable airfoil consisting of at least one airfoil or like streamlined surface, this result being obtained by applying a novel method of transforming energy which takes advantages of the viscosity of fluids.

To this end, it is the primary object of the invention to provide a method of transforming energy in fluid media by utilizing a wing-system consisting of at least one airfoil or like streamlined surface, this method being characteristed in that, while performing the desired energy transformation by means of said streamlined surface or airfoil, there is created and maintained, by means of the same surface or airfoil, a vortex doublet lying within the plane of action of said surface or airfoil, which corresponds to the section of a vortical tube looped on itself, said vortex doublet returning the energy accumulated thereby by blowing simultaneously and proportionally the upper or outer surface of said airfoil, thus inhibiting any separation or break-down of the fluid flow at this point.

Therefore, this method is based on the fluid-flow effect of a doublet of spaced vortices. Now this effect, while producing a considerable variation in the fluid velocity as a consequence of the strong incidences thereby permitted to said airfoil, since it inhibits the fluid-flow separation or break-down on its upper or outer surface, will concentrate the fluid output crossing its plane of action and apply a strong deflection or wash downstream thereof.

According to a complementary feature characterising this method the desired fluid-flow is obtained by creating fluid-flow peculiarities having the following characteristics:

(a) The circulation of velocities in the fluid medium, about the airfoil or streamlined surface, is periodically reversed and may notably be of oscillating nature;

(b) Each counter-circulation resulting therefrom has its center located at any point and time at a limited distance from the trailing edge of said airfoil.

This invention is also concerned with a specifice form of embodiment of the method set forth hereinabove, this form of embodiment being characterised in that the airfoil or streamlined surface of the wing-system utilized for carrying out said method is caused to perform two flapping movements of which one is of transverse nature and the other of rotary nature, these flapping movements being further characterised by the following features:

(i) The transverse flapping movement has two components having two directions perpendicular to each other and to the span of the airfoil, one of these components of relatively great amplitude having half the frequency of the other component of relatively small amplitude;

(ii) The rotary flapping movement, which is fixed, has the same frequency as the great amplitude component of the transverse flapping movement but is out of phase by about one half-period in relation thereto;

(iii) The sequential order and the direction of the two flapping movements are such that the edges of the wing-system airfoil constantly differ from each other as to their specific function;

(iv) The amplitude and frequency of the two flapping movements are selected from a range such that the resulting vortex doublet of the fluidic flow are both coherent and unitary, as a function of magnitudes such as: constants of the airfoil and fluid involved, and variable of the relative velocity of translation of the transformer utilizing same.

In addition to the good dynamic balance thus obtained this specific form of embodiment permits the use of airfoils having conventional leading-edge profile and centering characteristics.

The present invention is also concerned with a machine for transforming energy in fluid media by carrying out the method set forth hereinabove. According to a particularly advantageous form of embodiment, this machine comprises at least one airfoil of the vane, blade or wing type, guided from its root end by at least one connecting-rod having its ends pivotally suspended from each crank-pin of a pair of crank arms of equal length and rotatable in opposite directions in a common plane (except for the level), by virtue of the continuous action of said connecting-rod, or the intermittent action of said connecting-rod and of a shaft, worm or pinion, or alternately by the continuous action exerted respectively by said connecting-rod and said shaft or pinion on each crank arm, whereby the thus guided airfoil will describe a closed path intersecting itself, in addition to its alternating rotational movement.

The characteristic features of this machine, as well as those of the method of transforming energy in fluid media according to this invention, will appear more clearly as the following description proceeds with reference to the accompanying drawing illustrating diagrammatically only relatively simple symmetrical arrangements in order to facilitate the understanding, thereof: however, it will be readily apparent to anybody conversant with the art that the arrangements illustrated in the drawing are given by way of example only, since many modifications and variations may be brought thereto in actual practice without departing from the basic principle of the invention as set forth in the appended claims. In the drawing:

FIGURE 1 illustrates in bi-dimensional view the energy transformation method of this invention, wherein the doublet is shown in the form of oriented arcs intersecting the plane of action of an airfoil designated diagrammatically by a short dashed line $X_a$, $\theta_{bb'}$, $X_{a'}$, and divided by a dash-and-dot line $z_s$, $Z_{s'}$, representing the plane separating the two vortices centered at $\Omega_1$ and $\Omega_2$, respectively;

FIGURE 2 illustrates momentarily and in three-dimensional view one portion of the airfoil K moving in a fluid medium with the observer and producing a uniform flow by means of a specific form of embodiment of this invention, this flow $\gamma$ being designated diagrammatically by oriented lines reproducing the fluid flow;

FIGURES 3a, 3b, 3c and 3d illustrate in bi-dimensional views, with reference to the static action of an energy transformer, typical examples of the evolutive kinematics of an airfoil according to the form of embodiment contemplated herein; thus, FIGURE 3a shows two complementary half-cycles, one in short dash line and the other in thin, continuous line, of the path followed by an upstream point $k$ of the airfoil, with its characteristic and intermediate positions;

FIGURES 3b and 3c shows two different inclinations of an external force $g$ in relation to the same airfoil illustrated in different characteristic positions of its profile, and FIGURE 3d shows a limit-case of this kinematic arrangement corresponding to a modification in the use of the energy transformation method;

FIGURES 4a, 4b, 4c and 4d illustrate diagrammatically the evolution in time of the kinematics of an airfoil and of the fluid-flow peculiarities corresponding thereto, this evolution being represented on a cartesian dihedron by:

Figure 8:
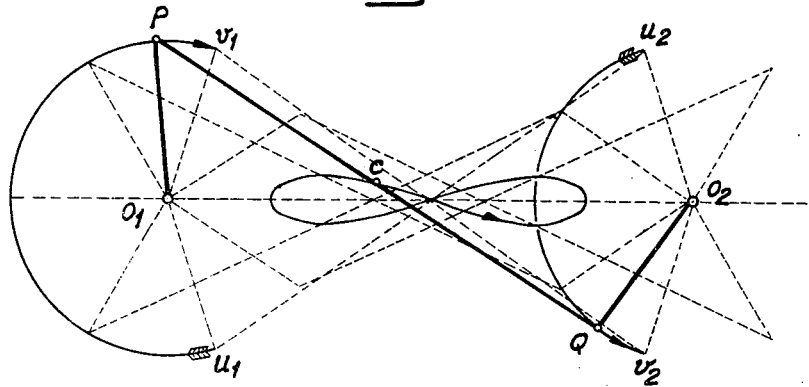
Figure 6:
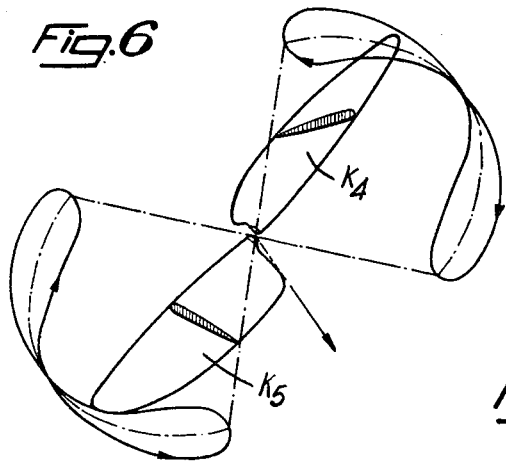
Figure 5:
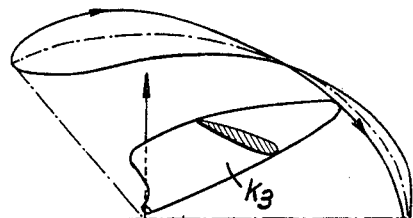
Figure 7:
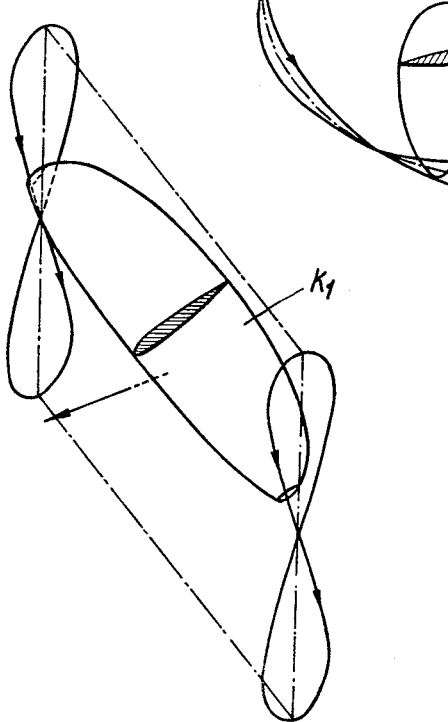

a dotted line in the case of the rotary flapping movement $\theta$, a long-dash line in the case of the two components X and Z of the transverse flapping movement;

a dot-and-dash line for the circulation intensity $\Gamma$;

a thick and continuous line in the case of the intensity of vortices $\Omega_1$ and $\Omega_2$;

a short-dash line in the case of the velocity of translation of the transformer;

FIGURES 5, 6 and 7 are three-dimensional illustrations of typical examples of airfoil configurations and arrangements for machines constructed according to the teachings of this invention, the airfoil surfaces shown in thick continuous lines being also shown in cross-section in the shaded portions $k$, their plane of action being illustrated by a dash-and-dot line, and their end path by a thick line;

FIGURE 8 illustrates by way of example different phases of the operation of a mechanical form of embodiment of the method of this invention, the dash lines showing the characteristic and intermediate positions, and the thick line an arbitrary position; and FIGURE 9 shows in isometric perspective view the essential component elements of a mechanized machine selected for illustrating the invention.

Figure 2:
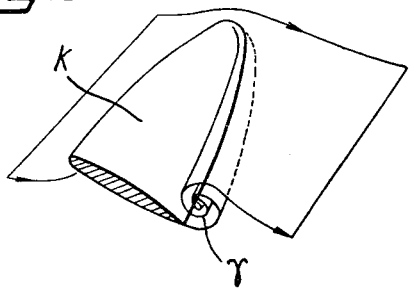

As already expained in the preamble of this description, the method of the invention consists in transforming energy in a fluid media by means of a wing-system consisting of at least one airfoil such as the airfoil K of FIGURE 2, while creating and maintaining, with the same airfoil a vortex doublet located within the plane of action of said airfoil.

Figure 1:
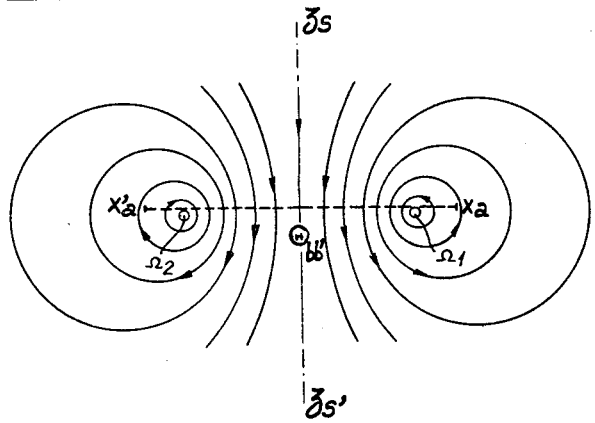

FIGURE 1 illustrates an average and symmetric application of this effect obtained by carrying out the method of this invention. This case is illustrated in cross section with respect to the non-rotational fluid flow, in the upstream to downstream direction of the plane of action $X_a$, $\theta_{bb'}$, $X_{a'}$ of an airfoil such as K.

Three-dimensionally, this flow is closed on itself and therefore forms a loop peripherally interior to the plane of action of the wing-system the configuration of this loop depending on the wing-system arrangement and configuration.

The vortex doublet $\Omega_1$ and $\Omega_2$ characterising the method of this invention may be obtained and maintained by using novel and particularly advantageous means.

In fact, it is known that the flow produced about a continuously moving airfoil has an indefinitely extended wake.

On the other hand, the means contemplated for carrying out the principle of this invention consists of producing about said airfoil a flow having a limited wake which, as already explained hereinabove, is characterised by the fact that:

(a) The circulation of the fluid velocities about the airfoil is periodically reversed and may notably be of oscillating nature;

(b) Each counter-circulation $\gamma$ resulting therefrom has its center located at any point at a limited distance from the trailing edge of said airfoil.

FIGURE 2 shows in diagrammatic perspective form the momentary shape of this type of flow; as the circulation is reversed by turns during a period, two of these counter-circulatory vortices $\gamma$ are formed in succession, in opposite directions and at a relatively reduced relative distance, thus generating the doublet $\Omega_1$ and $\Omega_2$, and maintaining same during the subsequent periods.

As contrasted with the conventional forms of embodiment consisting as a rule in producing the continuous and nonreversible movement of the airfoils, the form of embodiment contemplated herein and according to the energy transformation method and means of this invention, consists of an alternating composite motion obtained by imparting to at least one airfoil, such as K, two flapping movements, namely:

(I) A first angular and/or translational flapping movement taking place transversely to said airfoil and having two directions perpendicular to each other and to the airfoil span; one of these components, i.e. the one having the major amplitude, has a frequency compulsorily equal to one-half of the value of the other frequency, and may even be zero in certain cases;

(II) The other movement is an invariable movement of rotation of the airfoil, has the same frequency as the major component of the aforesaid flapping movement, but is out of phase in relation thereto by a value fluctuating about one-half of said common cycle or period.

FIGURES 3a, 3b, 3c illustrate diagrammatically typical examples of this kinematic arrangement. In connection with this figure, a point located on the longitudinal axis of an airfoil designated by its profile $k$ follows a path undergoing a double deflection from the end point $X_a$ of its transverse flapping movement to its homologue $X_{a'}$ and passes through the point of mergence $\theta_{bb'}$ of its rotation reversals and through the end point $Z_c$ and $Z_{c'}$ of its axial flapping movement, which are located in planes disposed externally of the general plane of action $X_a$, $\theta_{bb'}$, $X_{a'}$.

Of course, the complementary half-cylce will be symmetrically reversed with respect to the double position $\theta_{bb'}$, as illustrated by the half-cycles of FIGURE 3a, the path shown in dash line and followed by the point selected on the airfoil $k$ being the complement of the path shown in thick line.

When the external forces likely to act on the airfoil are moderately oblique or perpendicular thereto, this form of embodiment combined with the means producing the effect of the method of this invention has the following characteristics:

From $X_a$ to $Z_c$, the transverse flapping movement component of the velocity along $x$ decreases while the component along $z$ increases; as the variation in intrinsic velocity is moderate only its direction varies by $\pi/2$ radian, but the substratcive rotation gives to the airfoil an incidence which, though initially zero, is equal to this difference at $Z_c$. Under these conditions a circulation $\Gamma$ of the fluid velocities is produced about the airfoil; however, due to the particular movement of its trailing edge the counter-circulation $\gamma$ is released only in the vicinity of $Z_c$, thus creating or integrating same with the vortex $\Omega_1$ which, in this last case, is regenerated.

From point $Z_c$ to point $\theta_{bb'}$, and concomitantly with the rotation and with the variation in the inclination of the airfoil flapping movement, the variation in the incidence decreases, contrary to the variation in the intrinsic velocity, for its two components increase simultaneously, thus leading, due to the coercion with rotational tendency which it produces in the flow, by viscosity counter-action, to an acceleration of the vortex preceding $\Omega_1$ which, in return, due to the blowing effect exerted thereby on the upper or outer surface of the airfoil, permits the strong incidence of this airfoil.

After $\theta_{bb'}$ and from this point to $Z_{c'}$ the incidence, although of opposite direction, keeps varying moderately while the intrinsic velocity is reduced considerably, for its two components decrease simultaneously. As a result, a beneficial "over-circulation" is obtained which compensates the decrease in the influence of vortex $\Omega_1$.

From $Z_{c'}$ to $X_{a'}$ the incidence decreases rapidly, thus compensating the reduction in the rate of decrease of the intrinsic velocity; the thus maintained "over-circulation" permits the rapid progression of the trailing edge of the airfoil, without causing any separation or break down thereat.

Beyond $X_{a'}$ the complementary half-cycle begins with effects symmetrical to those of the preceding half-cycle. This doublet is maintained by the successive creation and reinforcement of vortices $\Omega_1$ and $\Omega_2$.

However, in order constantly to preserve the conventional specifications concerning the leading and trailing edges, this kinematic sequence must compulsorily take place in the direction shown in FIGURES 3a to 3d with respect to the average orientation of the airfoil.

In this specific and exemplary form of embodiment of the method of this invention, which utilizes a single airfoil such as K, the doublet vortices move substantially in opposition to each other. However, their evolutions could be perfectly in phase for example in the case comprising two airfoils actuated in phase opposition in a common plane of action according to symmetrically similar kinematic arrangements (*mutatis-mutandis* according to the number and relative arrangement of the air-foils constituting a same wing-system).

Although this kinematic arrangement is necessary for carrying out the present invention according to this specific form of embodiment, from the qualitative point of view, it is inadequate if the magnitudes of the quantities of the amplitudes of its component elements are not adjusted in relation to the fluid and to the airfoils utilized therein. Moreover, these magnitudes should be adjusted in relation to each other as a function of practical or exploitation magnitudes such as the relative velocity of the fluid to infinity, or the obliqueness of an external force such as gravity.

The amplitude of the flapping movement, for a given relative velocity to infinity, is such that it cannot cause the vortex doublet to develop into multiple, incoherent vortices. Should the velocity to infinity change, this function will vary and it will be necessary to either continuously match these amplitudes for a same frequency or modify the latter, or alternately the assembly, with a view to produce similar effects as shown in FIGURES 4a and 4b wherein the velocity to infinity increases regularly.

The machines contemplated according to this invention and based on the method disclosed hereinabove in conformity with this specific form of embodiment, and wherein the common principle is the action or the reaction of the wing-system, may be divided into several types or categories:

(A) Power units (generally stationary) adapted to transform the kinetic energy of a fluid into a mechanical energy available in the form of forces and/or torques;

(B) Power units (generally movable) adapted to transform the same kinetic energy into a resultant force acting on the wing-system and utilized directly by this system to produce a movement of translation or lift;

(C) Generators (generally stationary) adapted to transform any energy into a kinetic energy of the surrounding fluid medium; and (D) Generators (generally movable) adapted to transform any energy into a tractive or lifting force.

Of course, machines of types (A) and (C), or machines of types (B) and (D) may be the same but reversible machines.

A specific form of embodiment of the method of this invention consists of a movable machine, wherein the variations may be caused by the action of an external force such as the weight of the machine, whilst an oblique resultant is desired and for which one may either incline the plane of action or phase-shift the rotation in relation to said plane, or alternately combine these two solutions as shown by the two exemplary forms of embodiment of FIGURES 3b and 3c.

These variations, considered in the increase direction, as illustrated in FIGURES 4a, 4c and 4d, widen the field of application of the machine according to this invention to such an extent that the energy transformation method may even be changed thereby, thus affording the possibility, according to this invention, of attaining the above-described permanent operating conditions.

Considering these FIGURES 4a, 4c and 4d, the oblique component causes a gradual distortion of the fluidic singularities $\Omega_1$, $\Omega_2$ and $\Gamma$.

The beginning of this variation and in contrast to the amplitude of the kinematic components X, Z and $\theta$, the frequency increases, thus preserving the flow according to this invention although it is asymmetrical. Then this frequency becomes constant and the circulation $\Gamma$ which changed from oscillating to alternating will change to the undulating condition and then to the constant condition, although the kinematics be integrally continued as far as its inherent nature is concerned, for the variation in the incidence by the direction of the velocity and the magnitude of this velocity are then exactly compensated by the rotation. Finally, as the amplitudes continue to decreases, a kind of conventional permanent operating condition is obtained, without any autonomous kinematics, as illustrated in FIGURE 3d.

However, the various phases of this evolution are not altogether necessary for obtaining the same result.

The machines according to this invention may comprise two or more airfoils constituting wing-systems according to various possible arrangements.

In the case of an angular configuration these airfoils may be arranged by opposed pairs, so that their movements maintain their symmetry either with respect to a straight line as illustrated by the surfaces $K_2$ and $K_3$ of FIGURE 5, or with respect to a common point as illustrated in FIGURE 6 in the case of surfaces $K_4$ and $K_5$. The arrangement if FIGURE 5 facilitates a change in the practical application of the wing-system and the arrangement of FIGURE 6 improves its stability.

In the case of an arrangement aiming at producing a movement of translation, there is a constant symmetry of the movement in relation to a straight line, as illustrated by the surface $K_1$ of FIGURE 7.

Whatever the configuration contemplated, it is possible to impart a motion of this character to a plurality of airfoils or profiled surface having a common plane of action by phase-shifting their identical kinematics. A specific case consists of the actuation at a same level of two airfoils having their homologue movement in phase-opposition.

Of course, the various arrangements and configurations illustrated diagrammatically in these figures can be multiplied and combined together in a same energy transformer, *mutatis-mutandis*, in juxtaposition or not with airfoils or like planes operating under conventional conditions, without departing from the scope of the invention.

Mechanical systems of reciprocating or alternating nature, adapted to yield the particular airfoil kinematics according to this invention, may be rather difficult and delicate to carry out in actual practice if the ponderal values and necessary power output values become relatively high; it is therefore another object of this invention to provide a novel mechanical arrangement consistent with the kinematics of these machines.

The corresponding triple oscillation in a plane, according to the mechanical method constituting the subject-matter of the present invention, is obtained from a material point located on a segment suspended at its ends from two other material points compelled to describe circular revolutions in opposite directions about their relevant centers spaced from each other by the value of said segment.

Considering the diagram of FIGURE 8, the movements performed by said material point $c$ located for the sake of simplification centrally of a segment having its ends adapted to pivot about material pivot points P and Q equally spaced from their centers of revolution $O_1$ and $O_2$, are obtained when anyone of these points, for example point Q, describes a circular path $V_2U_2$, while its homologue P describes in the opposite direction the path $U_1V_1$, complement of a circle, and vice versa, as shown by the corresponding arrows associated with these paths.

As shown in the same figure, two successive operations like the one described in the preceding paragraph are sufficient for reproducing the triple oscillation of point $c$ which is thus caused to described, in addition to its alternating rotation, the closed curve having a double tangential point shown in the form of a continuous thick line and having the direction selected for the respective revolutions of points P and Q of which the characteristic positions lie at the ends of the dash lines intersecting their paths.

Many alternate forms and/or variations may be obtained from this basic mechanical system; thus, notably, the ratio of the length to the relative spacing of the pivot points P and Q at their respective centers $O_1$ and $O_2$, will control the relative proportion of the three oscillations and, therefore, the trend of the curve.

Similarly, according to the position of point $c$ between the two ends P and Q of the segment, different proportions in the asymmetry of the paths may be obtained. At the limit, when this point $c$ is equally spaced from the two points P and Q, as in the example illustrated in FIGURE 8, there is no asymmetry whatsoever in relation to the double tangential point.

This mechanical process may be synthetized in the time by simply applying a torque to centers $O_1$ and/or $O_2$.

In the case of a constant torque applied to a single center $O_1$ or $O_2$ the velocities will not be symmetrical along the resulting curve but if this symmetry is desired this constant torque must necessarily be distributed among the two centers $O_1$ and $O_2$ when they attain the same velocity, according to two alternatives:
either during an extended time period when their average velocity attain its minimum value,
or during a shorter time period when their average velocity attains its maximum value.

Finally, it is also possible to simultaneously transmit this differential torque to each one of said centers $O_1$ and $O_2$.

This mechanical process applied to an airfoil affords various solutions to its kinematic problem according to the selected arrangements and configurations.

Thus, for example, if this airfoil were disposed at right angles and directly by its root at said point $c$, the triple oscillation in a same plane of this point would cause the longitudinal axis of said airfoil to describe, in addition to its alternate rotational movement, an infinity of cyclical paths having an intersection point, these paths enveloping two cylindrical volumes open at their ends and admitting two separte tangent planes, as exemplified in FIGURE 7.

However, it is also possible, by adapting known systems to this mechanical process, to obtain paths enveloping two conical or frusoconical volumes, as shown in FIGURES 5 and 6, together with an alternate rotation of the longitudinal axis of said airfoil, which rotation is amplified and/or independent.

The field of the possible practical applications of the basic principles of the present invention is so broad and diversified that only an extremely simplified and purely exemplary form of embodiment of the machine for transforming energy in a fluid medium will be described hereinafter, this machine comprising at least one airfoil such as vane, blade or wing.

Therefore, the criteria governing the utilization of the exemplary machine illustrated in FIGURE 9 of the drawing, which is based on the energy transformation method and mechanism of this invention, apply only to the type or category of machines adapted to generate power from an alternatively distributed torque applied for example to a single blade K performing alternate partially driving rotational movements, which blade K is effectively phase-shifted by a half-cycle in relation to its transverse flapping movement, and has a symmetrical profile and preselected angular movements.

Considering this figure, the form of embodiment of the method according to the present invention will be obtained in the plane of action of the blade K of which the kinematics is obtained by means of a transmission shaft T supporting a pair of helical worms $e_1$ and $e_2$ having opposite pitches, each worm being periodically coupled or in meshing engagement with a corresponding toothed segment solid with a crank arm $B_1$, $B_2$ mounted in a bearing having its axis at $O_1$ or $O_2$, respectively. Each arm $B_1$ and $B_2$ comprises a crankpin $H_1$ and $H_2$ pivotally connected to the relevant end of a connecting-rod J comprising intermediate said ends a Universal or Hooke's joint C.

The male element S of a telescopic shaft is pivotally connected to said joint C, and the female element R of this shaft is journalled in a lubricated ring G suspended in turn in another Universal joint as at F in a plane parallel and external to that of said connecting-rod J, and having its axes contained in a plane perpendicular to the plane containing the axes $O_1$ and $O_2$.

The female element R comprises on the side of said suspension F opposite to joint C a clamp A securing the root of blade K.

Moreover, this blade is connected to the universal joint C by means of an internal spring W mounted in the telescopic shafts S–R.

This machine operates as a generator when a torque is applied to shaft T and transmitted thereby respectively in opposite directions and alternately to each crank arm $B_1$ and $B_2$ through the worms $e_1$ and $e_2$ and their corresponding toothed segments.

The crankpins $H_1$ and $H_2$ will thus transform by turns this alternating torque into multidirectional rotation and movement of connecting-rod J which will thus perform a triple oscillation, the center of this connecting-rod following a plane and closed path having a point of intersection, which is shown in dash lines in FIGURE 9, said path being oriented as a function of the direction of movement of the connecting-rod mechanism as shown diagrammatically by the arrows in FIGURE 9.

The mechanical impulse produced in this connecting-rod J is transmitted to the blade K through the medium of the double Hooke's joints C and F transforming the reciprocating movements of joint C into angular flapping movements having their common center located in the second Hooke's joint F.

The alternating rotation of the first Universal joint C which is caused by the alternate inclination of connecting-rod J and guided radially towards the blade K by the ring G is transmitted via the spring W which regulates and renders somewhat more flexible this alternate rotation by constantly permitting and balancing by its torsional force the moment of this blade. The other function of this spring W, which results from its tractive work (caused by the continuous variation in the length of the telescopic shaft S, R, connecting the joint C to joint F), consists in regularizing the stress in this blade by periodically storing and returning its mass energy.

The thus guided blade K describes at a point selected along its longitudinal axis across its section $k$ a closed path having a single intersection point, which is shown by the continuous thick line in FIGURE 9 and oriented according to the direction consistent with the specific form of embodiment of the effect contemplated according to the energy transformation method of this invention, so that an exploitable reaction effort is obtained of which the general resultant is designated by a straight arrow in the figure.

It will readily occur to anybody conversant with the art that this action can be double by providing another blade driven through homologue transmission members disposed symmetrically on the opposite side of the connecting-rod, by crossing same for example on either side of the crank arms $B_1$ and $B_2$, and turning one of these arms inside-out.

Similarly, from a mechanism of this type it is possible, by adding adequate servo means thereto, to vary at will the relative spacing and arrangements of some of the component elements thereof, for example by using a sliding mounting of one of the worms on a splined transmission shaft, concomitantly with the movement of the crank arm axes away from each other and with the use of an extensible connecting-rod; alternately, the displacement of the Hooke's joint C along the connecting-rod proper may be contemplated, or means for adjusting the relative positions of the two Hooke's joints, etc.

All these possibilities taken separately or in any possible combination operating according to the possible forms of embodiment and variations in the mode of actuation of the method of this invention permit of transforming the characteristics of this machine during its operation, notably in a static manner as a consequence of a change in the transformation method, further permitting a modification in the dihedron and even in the sag of the airfoil.

Of course, any modification by substitution of equivalent members such as bell-and-socket joints, gears having a variable diametral pitch, application of opposite torques transmitted continuously via a differential to the crank arms, and various juxtapositions, may be brought without departing from the spirit and scope of the machine according to this invention.

Similarly, this mechanical process should not be construed as limiting the field of application of this type of machine, since known and conventional mechanical means may be used in the construction of the machine. An elastic or even flexible system such as a working structure of the airfoil may be used for producing one, two or even three movements of its kinematics, in its generator or power-unit form, if the origin of the energy consists of one or more vectorial forces acting directly from the wing-system, these various possible arrangements being furthermore superposable to the above-described guiding mechanism.

Such energy-transforming machines may be used by anybody conversant with the mechanisms of fluids in cases wherein hydrodynamics and aerodynamics, both internal and external, are now conductive to rotor-type energy-transforming wing-systems, in combination or not with stationary wing-systems, these machines like the exemplary forms of embodiment of the method of transformation according to this invention being given by way of example only and liable to many modifications and variations without departing from the basic principles of this invention as set forth in the appended claims.

What is claimed is:

1. Method of transforming energy in fluid media by means of a wing-system consisting of at least one airfoil, this method comprising transforming the energy by means of said airfoil; creating and maintaining by means of the same airfoil a vortex doublet located within the plane of action of said airfoil, which corresponds to the section of a vortical tube looped on itself, said vortex doublet returning the energy stored therein by blowing in a simultaneous and proportional manner on the upper or outer surface of said airfoil for inhibiting any separation of fluid flow from said surface.

2. Method of transforming energy according to claim 1, characterized in that the vortex doublet in the plane of action of each airfoil of a wing-system is obtained by creating, about each airfoil, fluid flow peculiarities having the properties, firstly, of periodically reversing the circulation of velocities in the fluid, about the profile of each air foil so that said circulation is of the oscillatory type, and secondly, of locating the center of each counter-circulation resulting therefrom at a relatively short distance from the trailing edge of said airfoil, at any point and any time.

3. Method of transforming energy according to claim 2, characterized in that said fluid flow peculiarities are obtained by causing one region of a doublet to become asymmetric in average value with respect to the other region, until one of said regions is eliminated, by producing an alternating, pulsating and finally uniform variation in the circulation of velocities in the fluid medium about the profile of each airfoil, and variation being continuous or selective.

4. Method of transforming energy according to claim 1 characterized in that said airfoil constitutes at least a part of a wing-system, and is caused to perfom two flapping movements, one of transverse and the other of rotary nature in a plane transverse to the airfoil span, wherein:

(i) the transverse flapping movement has two components having two directions perpendicular to each other and to the span of the airfoil, one of said components having a relatively great amplitude at half the frequency of the other component which has relatively small amplitude, (ii) the rotary flapping movement has the same frequency as the great-amplitude component of the transverse flapping movement but is out of phase by about one half-period in relation thereto, (iii) the sequential order and the direction of the two flapping movements are such that the edges of the wing-system airfoil differ from each other as to their specific function, (iv) the amplitude and frequency of the two flapping movements are selected from a range such that the resulting vortex doublet of the fluid-flow is both coherent and unitary, as a function of magnitudes such as constants of the airfoil and fluid involved, and variable of the relative velocity of translation of the transformer utilizing same.

5. Method of transforming energy according to claim 4, characterized by mechanically producing a triple oscillation of a material point of said wing-system airfoil by selecting this point on a portion of a line pivotally suspended at its ends at two other material points caused to perform circular revolutions in opposite directions about their respective centers spaced from each other by the length of said part of said line.

6. Machine of a stationary or movable type for transforming energy in fluid media, said machine, which may be operated as a generator or as a power unit, comprising a wing-system including at least one airfoil, and a mechanism for imparting to said airfoil a composite motion comprising two flapping movements, one transversely to the airfoil span and the other of rotary nature.

7. Machine according to claim 6 wherein said wing-system airfoil driving mechanism provides two configurations, combined with each other for producing the transverse flapping of said airfoil, namely a translational configuration and an angular configuration.

8. Machine according to claim 6 comprising at least one pair of airfoils driven symmetrically in relation to a point.

9. Machine according to claim 6 compirsing at least one pair of airfoils driven symmetrically in relation to a straight line.

10. Machine according to claim 6 comprising at least one pair of airfoils driven symmertically in relation to a point, said airfoils having a common plane of action, a phase shift being provided between the two flapping movements imparted to said airfoils.

11. Machine according to claim 10 wherein said wing-system airfoil driving mechanism has means for varying the obliqueness of said flapping movements when an external force is applied to said machine, and including means for inclining the plane of the transverse flapping movement and for shifting the rotary flapping movement of the airfoil until the respective fluid-flow peculiarities are rendered uniform.

12. Machine according to claim 6 wherein said mechanism for driving said wing-system airfoil has means for exerting thereon a vector thrust, and resisient means for urging said airfoil to the intermediate position of its flapping movements.

13. A machine according to claim 6 comprising a pair of crank arms, a connecting rod pivotally connected to the free ends of said crank arms, wherein said airfoil is a vane having a root portion operatively connected with said connecting rod, and drive means for rotating said crank arms in opposite directions in a plane.

14. A machine according to claim 13 wherein said drive means move said connecting rod.

15. A machine according to claim 13 wherein said drive means include a drive shaft, and worm gear transmission means connecting the same with said crank arms.

16. A machine according to claim 13 wherein said drive means include two drive shafts, and two transmissions connected with said crank arms, respectively.

References Cited

UNITED STATES PATENTS

| 940,753 | 11/1909 | Tower | 170—135 X |

FOREIGN PATENTS

| 494,680 | 6/1919 | France. |
| 1,195,068 | 5/1959 | France. |
| 19,378 | 1911 | Great Britain. |
| 401,580 | 11/1933 | Great Britain. |
| 261,129 | 11/1928 | Italy. |
| 360,335 | 1/1938 | Italy. |

EVERETTE A. POWELL, JR., Primary Examiner